United States Patent
Tanaka

(10) Patent No.: US 7,127,124 B2
(45) Date of Patent: Oct. 24, 2006

(54) METHOD, APPARATUS AND PROGRAM FOR COMPOSITE IMAGE GENERATION

(75) Inventor: Keisuke Tanaka, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 637 days.

(21) Appl. No.: 10/253,432

(22) Filed: Sep. 25, 2002

(65) Prior Publication Data
US 2003/0058256 A1    Mar. 27, 2003

(30) Foreign Application Priority Data
Sep. 27, 2001    (JP)    ............. 2001-297624

(51) Int. Cl.
*G06K 9/36*    (2006.01)
*G09G 5/00*    (2006.01)
(52) U.S. Cl. ..................... 382/284; 345/629
(58) Field of Classification Search ........... 382/284, 382/305, 312, 254; 345/619, 629, 638, 651; 348/37, 448, 586; 358/1.18, 1.15
See application file for complete search history.

(56) References Cited

U.S. PATENT DOCUMENTS

| | | | | |
|---|---|---|---|---|
| 6,034,785 A | * | 3/2000 | Itoh | 358/1.18 |
| 6,061,152 A | * | 5/2000 | Nihei et al. | 358/448 |
| 6,133,943 A | * | 10/2000 | Needham | 348/37 |
| 6,674,485 B1 | * | 1/2004 | Akiyama et al. | 348/586 |
| 6,853,461 B1 | * | 2/2005 | Shiimori | 358/1.15 |

* cited by examiner

*Primary Examiner*—Kanjibhai Patel
(74) *Attorney, Agent, or Firm*—Sughrue Mion, PLLC

(57) ABSTRACT

When image data sets are inserted in image data insertion areas in a template, the image data sets can be set preferably in the insertion areas with easy operation. A user connects a user terminal to a print order reception center via a network, and uploads the image data sets to be used. The user specifies reference points in the respective image data sets by using instruction input means. An order reception server displays composite images generated by matching the image data reference points with reference points predetermined in each of template data candidates at the time the template candidates are displayed.

6 Claims, 7 Drawing Sheets

METHOD, APPARATUS AND PROGRAM FOR COMPOSITE IMAGE GENERATION

BACKGROUND OF THE INVENTION

1. Field of the Invention

The present invention relates to a method and an apparatus for composite image generation by inserting image data in an insertion area of a template or the like, and to a program that causes a computer to execute the composite image generation method.

2. Description of the Related Art

There have been known digital photograph service systems for carrying out various types of digital photograph services such as storing photographs obtained by users in image servers after digitization thereof, recording the photographs in CD-Rs to be provided to the users, printing images photographed by users with digital cameras, and receiving orders for additional prints. As one form of such digital photograph service systems, a network photograph service system for receiving print orders or the like via a network such as the Internet has also been proposed.

In such a network photograph service system, a user installs viewer software in his/her personal computer, which acts as a user terminal, for reproducing image data recorded in a CD-R or obtained by a digital camera. The user reproduces images represented by the image data, and generates order information describing the content of an order by using an ordering function built-in to the viewer software if the user wishes to place an order. The user transfers the order information and the image data representing the images to be printed, from the user terminal to an order reception server via the network such as the Internet.

The order reception server transfers the order information and the image data to a print server installed in a laboratory or in a mini-laboratory of a DPE store. The print server prints the image data for generating printed matter such as an additional print, a picture postcard as a composite image generated from a template and a photograph inserted in the template, or a photograph album, based on the order information. In the case where the order reception server and the print server are located at the same place, printing is carried out immediately after reception of the image data and the order information.

The printed matter generated in the above manner is delivered to an agency specified by the user at the time of placing the order. In this manner, the user can receive the printed matter by paying a charge at the agency.

The order information herein referred to is information such as a processing number for specifying the content of a printing service (generation of ordinary prints or picture postcards or the like), an image number for specifying a photograph (a number representing an image data file), a print size, a quantity of prints, specification of printing paper (such as glossy or non-glossy), thickness of the printing paper, the content of photographic processing, and trimming specification, for example. The order information further includes information regarding the name, the address, the zip code and the phone number of the user, for example.

In the case where a picture postcard is ordered from the network photograph service system described above, image data representing a photograph to be used therefor are prepared and a template to be combined with the image data is selected from a selection page in which templates used for picture postcard generation are displayed. Each of the templates has an insertion area for the image data, and a position and an enlargement ratio are specified for insertion of the photograph represented by the image data in the insertion area. Furthermore, if necessary, an enlargement ratio and a rotation angle are also specified for the image data displayed in the image insertion area in the template, at the time of actually placing an order. In the case where the photograph represented by the image data is too large for the insertion area, the photograph is trimmed according to the size of the image insertion area. For this purpose, a range of the photograph displayed for insertion is specified as desired, by dragging the range with a mouse. In the network photograph service system described above, personal information such as the name the address, and the E-mail address of the user can be inserted in the picture postcard. A print image representing the picture postcard is generated in the above manner, and the user places the order if he/she is satisfied with the print image.

However, in the method described above, the print image of the picture postcard is not clearly understood before the photograph is inserted in the template. Furthermore, if the user is not satisfied with the print image after generating the composite image from the photograph and the template, the user needs to reselect another template to carry out the same procedures again, which is troublesome for the user. For this reason, there has been proposed a method wherein composite images generated by insertion of image data in templates are displayed so that a user can easily understand how the composite images look at the time of template selection. However, this method does not necessarily guarantee preferable display of the composite images, since each of the templates may have a different shape of the insertion area therein.

SUMMARY OF THE INVENTION

The present invention has been conceived based on consideration of the above circumstances. An object of the present invention is therefore to provide a method, an apparatus and a program that enable preferable setting of images in image data insertion areas by an easy operation.

A composite image generation method of the present invention is a method of generating a composite image by inserting image data in an image data insertion area of a template or the like, and the composite image generation method comprises the steps of:

setting insertion information including an image data reference point which is a reference point in the image data and is to be matched with a predetermined reference point in the image data insertion area; and generating the composite image by inserting the image data in the image data insertion area, based on the insertion information.

The image data reference point refers to a point specified by a user in the image data. The user specifies the image data reference point near the center of an area of an image represented by the image data, at the time of generating the composite image. For example, in the case where the image data represents a person and the face of the person is used for insertion in the image data insertion area, the user specifies a point near the center of the face as the image data reference point.

The predetermined reference point in the image data insertion area is usually set at the center of the image data insertion area. However, the predetermined reference point in the image insertion area is not necessarily limited to the center. Any point in the insertion area can be used as the predetermined reference point. This is because a layout may look better in some cases by shifting the center of the image used for insertion to the right or left of the center of the image data insertion area if the image data insertion area has a rectangular shape elongated in the horizontal direction, for example.

A composite image generation apparatus of the present invention is an apparatus for generating a composite image by inserting image data in an image data insertion area of a template or the like, and the composite image generation apparatus comprises:

insertion information setting means for setting insertion information including an image data reference point which is a reference point in the image data and is to be matched with a predetermined reference point in the image data insertion area; and composition means for generating the composite image by inserting the image data in the image data insertion area, based on the insertion information.

A program that causes a computer to execute a composite image generation method of the present invention comprises the procedures of:

setting insertion information including an image data reference point which is a reference point in image data and is to be matched with a predetermined reference point in an image data insertion area; and generating a composite image by inserting the image data in the image data insertion area, based on the insertion information.

In the composite image generation method, the composite image generation apparatus and the program of the present invention, the insertion information may further include an enlargement ratio and a rotation angle of an image represented by the image data, with reference to the image data reference point.

According to the present invention, the composite image is generated by causing the image data reference point specified by the user in the image data to match with the predetermined reference point in the image data insertion area. Therefore, even in the case where image data are inserted in a plurality of image data insertion areas, the user only has to specify the image data reference points in the image data. Even in the case where the image data insertion area is changed, the user does not need to re-specify how to insert the image, which leads to reduction in a burden on the user.

DESCRIPTION OF THE PREFERRED EMBODIMENT

Hereinafter, an embodiment of the present invention will be explained with reference to the accompanying drawings.

Figure 1:
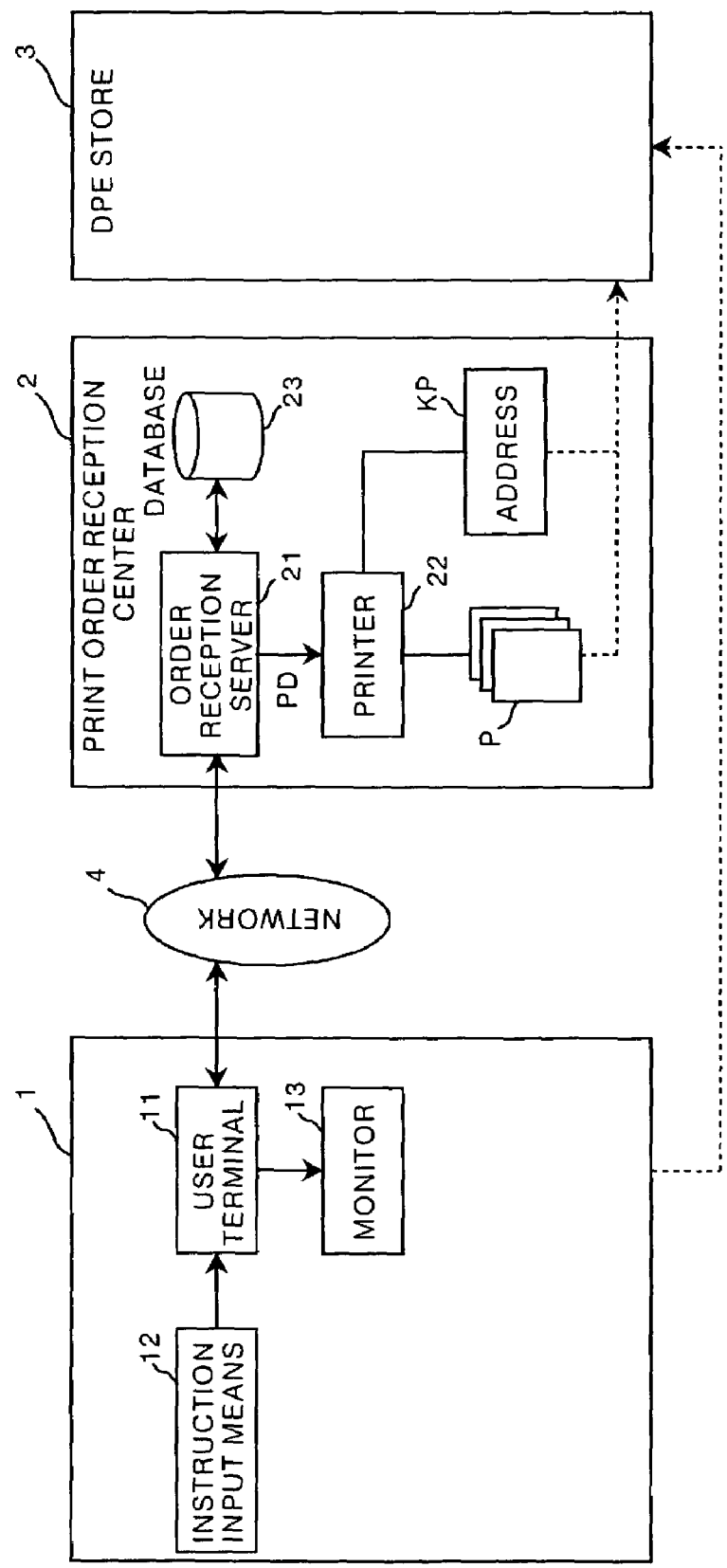
FIG. 1 is a block diagram showing a configuration of a first embodiment of a network photograph service system adopting a composite image generation method of the present invention.

FIG. 1 is a block diagram showing a configuration of a first embodiment of a network photograph service system adopting a composite image generation method of the present invention. In the network photograph service system in FIG. 1, prints, data, and the like are sent and received between a user 1, a print order reception center 2 and a DPE store 3.

The user 1 has a user terminal 11 such as a personal computer, and can place an order for a postcard or postcards P (hereinafter referred to as the postcards P) with the print order reception center 2 via a network 4. In the case where the user 1 does not have a personal computer, the user can use an order terminal installed in a service station or the like as the user terminal 11.

The user terminal 11 is connected to instruction input means 12 and a monitor 13. The instruction input means 12 is used for inputting an instruction for composite image generation or for placing a postcard order, and may comprise a keyboard and a pointing device such as a mouse.

The print order reception center 2 has an order reception server 21 for receiving the print order, a printer 22 for generating the postcards P from a postcard data set PD comprising a desired one of template data sets T and an image data set or image data sets G (hereinafter referred to as the image data sets G) sent from the user terminal 11 via the network 4 at the time the user places the order, and a database 23 that stores the template data sets T, agency address information K, and the like. The printer 22 generates a label KP by printing the address of an agency according to the agency address information K. In this manner, the print order reception center 2 can deliver the postcards P to the agency (to the DPE store 3, in this embodiment) by pasting the label KP on a bag containing the postcards P.

The user 1 can send the image data sets G from the user terminal 11 and can generate composite images by using the template data sets T. The user can also confirm the postcard data set PD, and can place the order for the postcards with use of the user terminal 11. At the time of placing the order, the user terminal 11 accesses the order reception server 21 in the print order reception center 2 according to Web browser installed in the user terminal 11. A Web page for placing the order is then displayed on the monitor 13 of the user terminal 11, based on information such as an html file or Java Script (Registered Trademark) stored in the order reception server 21. The user can place the order by using the Web page.

Figure 2:
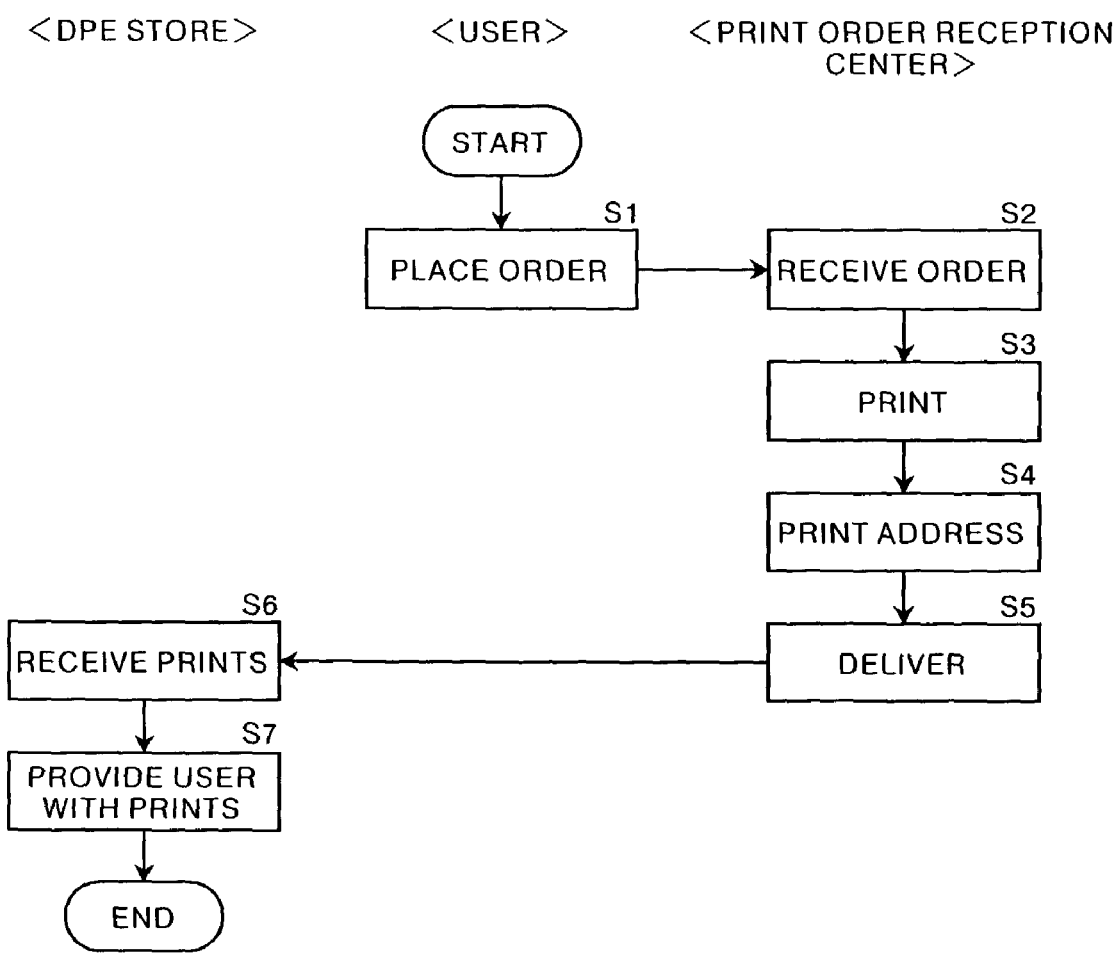
FIG. 2 is a flow chart showing the operation of the first embodiment.

The operation of the first embodiment will be explained next. FIG. 2 is a flow chart showing the operation in the first embodiment.

The user 1 sends the image data sets G to be used for generating the postcards P, and places the order regarding the postcard data set PD generated from the image data sets G and the desired template data set T (Step S1). The order is sent to the order reception server 21 in the print order reception center 2, and the order is received (Step S2). Hereinafter, the procedures at Step S1 and S2 will be explained in detail.

Figure 3:
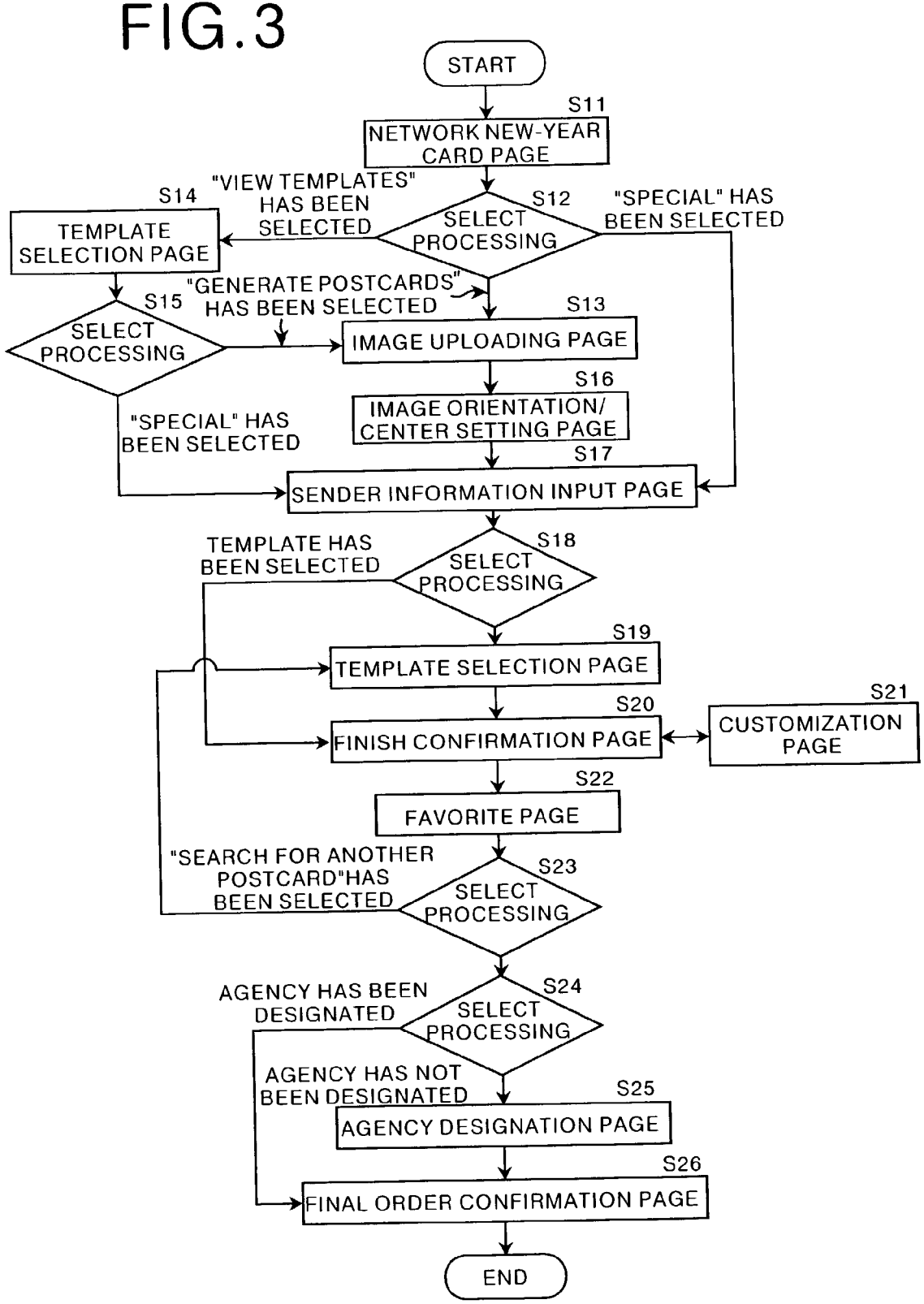
FIG. 3 is a flow chart showing when each of pages is displayed in the network photograph service system.

FIG. 3 is a flow chart showing how pages are changed in the network photograph service system. The user terminal 11 is connected to the order reception server 21 in the print order reception center 2 via the network 4 by the Web browser installed in the user terminal 11. At this time, the Web page for placing the order is displayed on the monitor 13 of the user terminal 11, based on the information stored in the order reception server 21. The user 1 inputs information necessary for placing the order, such as a user ID and a password, in order to connect the user terminal 11 to the order reception server 21.

After connection to the order reception server 21 is established, a network new-year card Web page (not shown) is displayed on the monitor 13 of the user terminal 11 (Step S11). The user 1 can select any desired item from a menu displayed in the network new-year card Web page (Step S12). The menu is largely divided into "View Templates" and "Generate Postcards". In "Generate Postcards", "1 picture", "2 pictures", and "Special" are selectable. The items "1 picture" and "2 pictures" refer to using 1 picture or 2 pictures for picture postcard generation, and "Special" refers to postcard generation without using a picture.

When the user 1 selects "View Templates", a template selection Web page (not shown) is displayed (Step S14). The template data sets T stored in the database 23 are displayed by being classified into categories, and all the template data sets T for "1 picture", "2 pictures" and "Special" are selectable. When the user 1 selects one of the template data sets T for "1 picture" or "2 pictures" in the template selection Web page, an image uploading Web page (not shown) is displayed (Step S13). In the case where the user 1 has selected one of the template data sets T for "Special", a sender information input Web page (not shown) is displayed (Step S17).

In this embodiment, the user 1 is assumed to have selected "2 pictures" in the network new-year card Web page.

Each of the Web pages shown from Step S13 to Step S22 has a "Search for Agency" button. The user 1 can designate an agency at which the user receives the postcards P in any one of the Web pages displayed at the above steps. The order reception server 21 displays an agency designation Web page that will be explained later, when the user 1 clicks the "Search for Agency" button. The order reception server 21 enables the user to designate the agency. After the agency has been designated, the order reception server 21 displays the Web page used immediately before designation of the agency.

When the user 1 selects "2 pictures" from the menu in the network new-year card Web page, the order reception server 21 displays the image uploading Web page on the monitor 13 of the user terminal 11 (Step S13). In the image uploading Web page, images represented by paths designated by the user 1 are previewed. The user 1 confirms the images in the preview, and clicks a "Send" button if the user 1 agrees to the images. After the Send button has been clicked, the image data sets G are transferred from the user terminal 11 to the order reception server 21. In this embodiment, two image data sets G1 and G2 are transferred as the image data sets G, since "2 pictures" has been selected in the network new-year card Web page.

Figure 4:
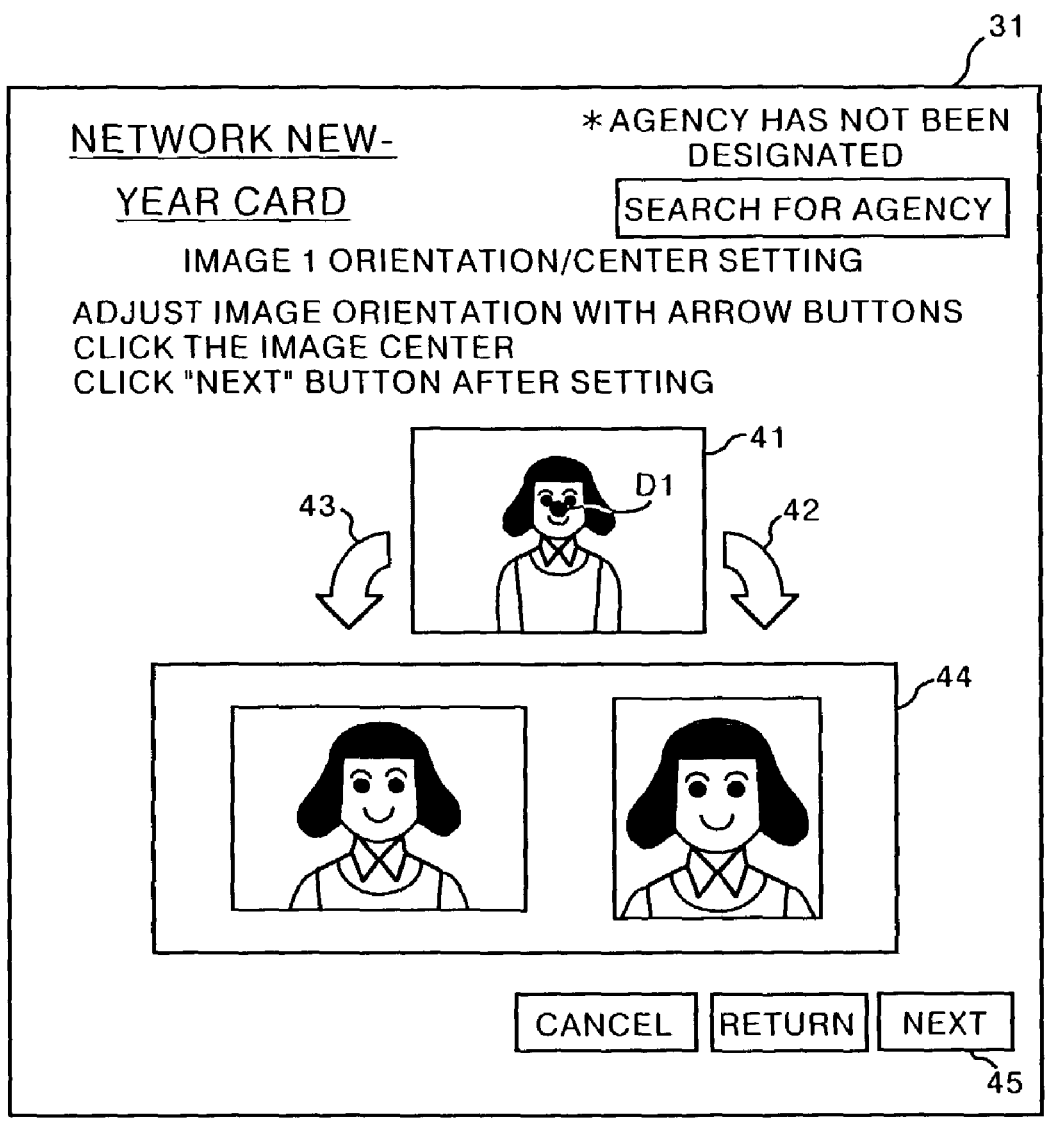
FIG. 4 shows an imagel orientation/center setting Web page.

The order reception server 21 receives the image data sets and displays an image1 orientation/center setting Web page 31 (Step S16), as shown in FIG. 4. The image represented by the image data set G1 sent by the user 1 in the image uploading Web page is displayed in an image display area 41 in the image1 orientation/center setting Web page 31. If the user 1 clicks an arrow icon 42 or an arrow icon 43 in the image display area 41, the image represented by the image data set G1 is rotated by 90° toward the orientation shown by the arrow icon that has been clicked. The user 1 designates the center of the image displayed in the image display area 41 to be inserted in an image data insertion area of each of the template data sets T, by clicking the center with a mouse. The point specified here by the user 1 is an image data reference point D1.

Once the center has been specified, trimmed images are generated by trimming the image in a portrait-orientation area set in advance and in a landscape-orientation area set in advance, with the center of the trimmed images located at the center designated by the user.

The image is generally trimmed by using a one to one enlargement ratio of the image data set G1. However, in the case where the area for trimming in the portrait orientation or in the landscape orientation is larger than the area of the image represented by the image data set G1, the enlargement ratio is increased to fully display the trimmed image in the corresponding area.

In the image1 orientation/center setting Web page 31, the trimmed images are temporarily designated for later displaying print images generated by combination with all the template data sets T. Therefore, the enlargement ratio is set to 1 or adjusted automatically. However, as will be explained later, the user 1 can adjust the enlargement ratio in a customization Web page 34.

The trimmed images in the portrait-orientation area and in the landscape-orientation area are shown in a composite image display area 44. Since the trimmed images are represented by only a portion of the image data set G1, the trimmed images are displayed after being enlarged appropriately so that the user can easily understand how the trimmed images look.

The user 1 confirms the trimmed images and clicks a "Next" button 45 if the trimming result is satisfactory.

After the user 1 clicks the "Next" button 45, an image2 orientation/center setting Web page is displayed, since "2 pictures" has been selected in the network new-year card Web page. In the case where "1 picture" has been selected in the network new-year card Web page, the sender information input Web page is displayed.

The image2 orientation/center setting Web page is the same as the image 1 orientation/center setting Web page 31. The user 1 sets the rotation angle (that is, the orientation) and the center used as an image data reference point D2 for the image data set G2, and confirms trimmed images displayed in a composite image display area, as in the case of the image data set G1. If the trimming result is satisfactory, the user 1 clicks a "Next" button.

The order reception server 21 displays the sender information input Web page (Step S17), when the user 1 clicks the "Next" button in the image2 orientation/center setting Web page. The user 1 inputs the zip code, the address, the family name, the given name or names of his/her family member or members, and a contact number to be printed on the postcards P, in the sender information setting Web page. After inputting all the sender information, the user 1 clicks a "Next" button. The order reception server 21 displays another one of the pages when the user 1 clicks the "Next" button in the sender information input Web page. In the case where the user 1 has already selected one of the template data sets T, a finish confirmation Web page 33 is displayed. In the case where template selection has not been carried out, a template selection (step 1) Web page (not shown) is displayed (Step S18).

In this embodiment, template selection has not been carried out, since "2 pictures" has been selected in the network new-year card Web page. Therefore, the template selection (step 1) Web page is displayed (Step S19). The categories of the template data sets T each having two image data insertion areas are displayed in the template selection (step 1) Web page. The user 1 selects one of the categories as desired, and clicks the desired category with the mouse. The order reception server 21 displays a template selection (step 2) Web page (not shown), after selection of the category by the user 1 in the template selection (step 1) Web page. In the template selection (step 2) Web page, the order reception server 21 enables the user 1 to select either the portrait orientation or the landscape orientation. In this embodiment, the user 1 is assumed to have selected "standard new-year cards" and the "portrait orientation".

Figure 5:
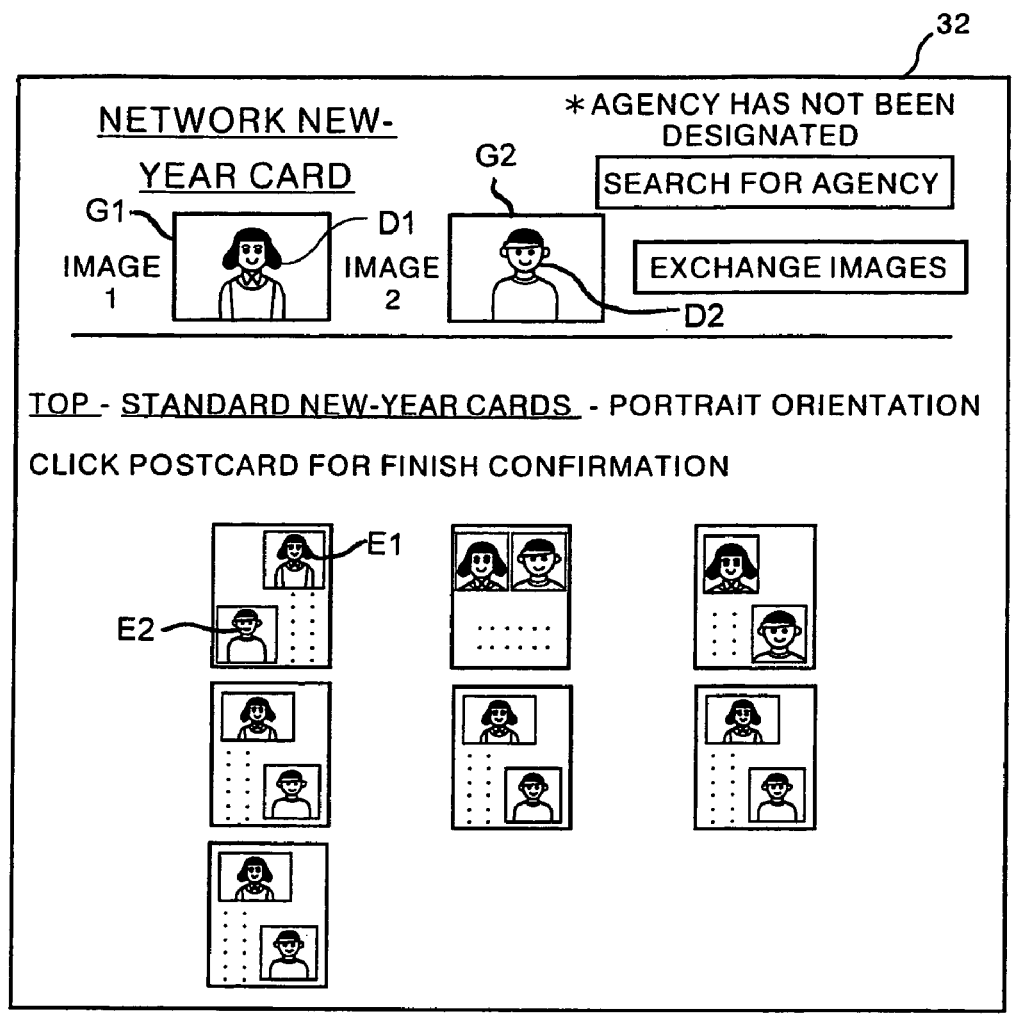
FIG. 5 shows a template selection (step 3) Web page.

The order reception server 21 displays a template selection (step 3) Web page 32 as shown in FIG. 5, after selection of the postcard orientation in the template selection (step 2) Web page. In this page are shown composite images of picture postcards generated by inserting the image data sets G1 and G2 in the image data insertion areas of each of the template data sets T corresponding to the conditions specified by the user 1.

Each of the template data sets T for "1 picture" has one image data insertion area for the image data set G1. Likewise, each of the template data sets T for "2 pictures" has two image data insertion areas for the image data sets G1 and G2. The image data insertion areas respectively have reference points E to be matched with the image data reference points. Each of the reference points E is generally set at the center of the corresponding image data insertion area. However, depending on the shape of each of the image data insertion areas, the corresponding reference point may be set at a position other than the center, for the sake of a preferable layout.

When the template data sets T are displayed in the template selection (step 3) Web page 32, the print images are generated by inserting the trimmed images at the two reference points E (hereinafter referred to as the reference points E1 and E2) so as to cause the image data reference points D1 and D2 (hereinafter, referred to as the image data reference points D) of the image data sets G1 and G2 to match the corresponding reference points E1 and E2.

In this embodiment, since the user 1 has selected the "standard new-year cards" and the "portrait orientation" for "2 pictures", the print images are generated and displayed by inserting the trimmed images in the two image insertion areas of each of the template data sets T corresponding to the above conditions set by the user 1.

Figure 6:
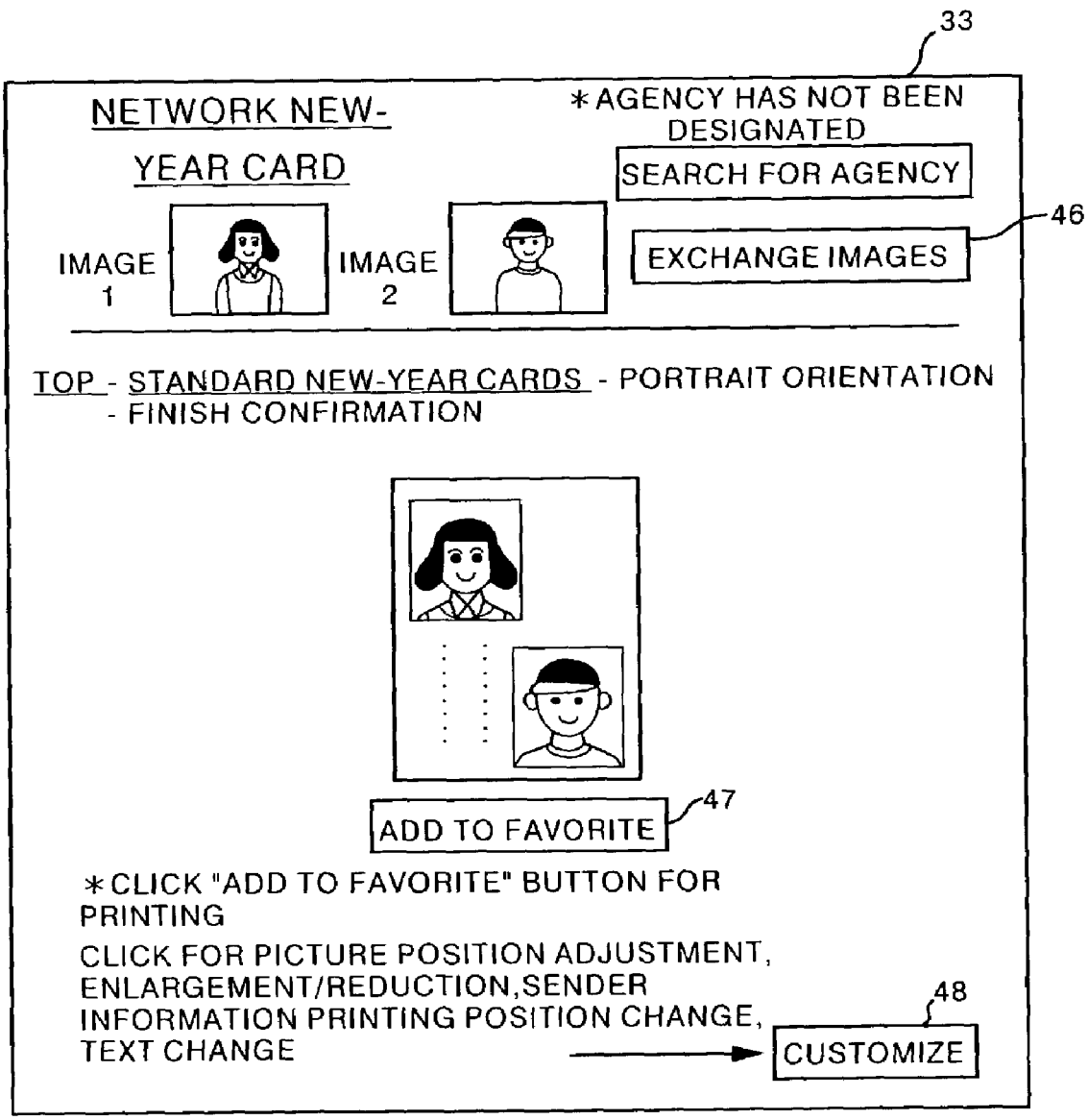
FIG. 6 shows a finish conformation Web page.

The user 1 selects any one of the template data sets T as desired by clicking the desired template data set with the mouse. The order reception server 21 displays the finish confirmation Web page 33 as shown in FIG. 6 (Step S20), after selection of the template data set made by the user 1 in the template selection (step 3) Web page 32. The template data set T selected by the user 1 in the template selection (step 3) Web page 32 is shown with the trimmed images inserted therein, in the finish confirmation Web page 33. The user 1 confirms the finish of the print image, and clicks an "Add to Favorites" button 47 if the result is satisfactory. In the case where the user 1 wishes to change a position or the enlargement ratio of the trimmed images, the user 1 clicks a "Customize" button 48. In this embodiment, the user 1 is assumed to have clicked the "Customize" button 48 to apply some changes to the print image.

Figure 7:
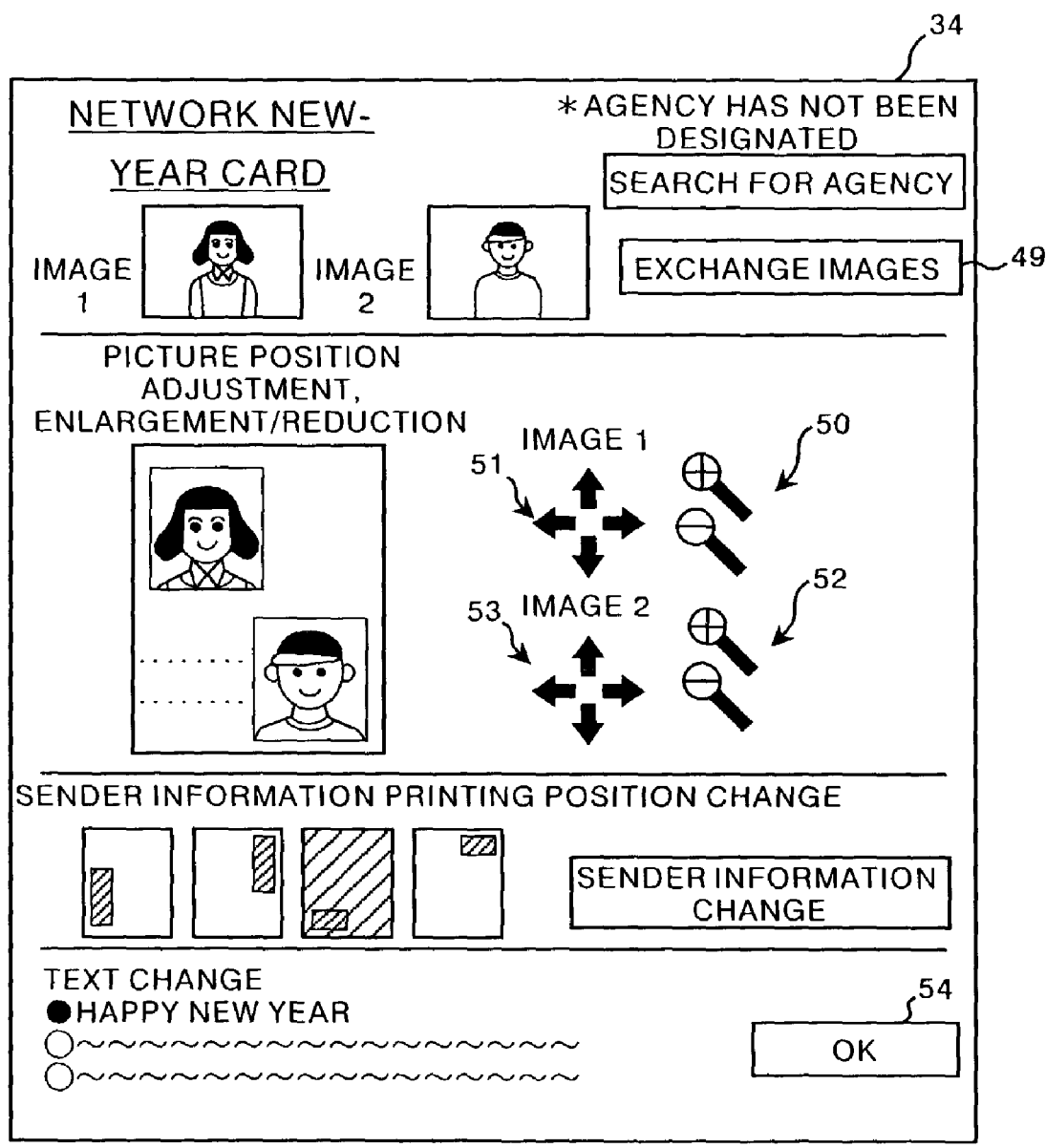
FIG. 7 shows a customization Web page.

The order reception server 21 displays the customization Web page 34 shown in FIG. 7 (Step S21) when the user 1 clicks the "Customize" button 48 in the finish confirmation Web page 33. In the case where an "Exchange Images" button 49 is clicked in the customization Web page 34, the position of the reference point E1 in one of the image data insertion areas of the template data set is replaced with the position of the reference point E2 in the other image data insertion area and vise versa. In this manner, the user 1 can exchange the image data insertion areas for the trimmed images generated from the image data sets G1 and G2.

The user can change the positions and the enlargement ratios for the respective image data sets G1 and G2, by using image manipulation icons 50 to 53. In the case where the user 1 clicks "+" of magnifying glass icons 50, the trimmed image generated from the image data set G1 is enlarged by a predetermined ratio, with the center of the trimmed image being located at the image data reference point D1. In the case of "−" of the magnifying glass icons 50, the trimmed image is reduced by the predetermined ratio, with the center being located at the same position. In the case where one of arrow icons 51 is clicked, the reference point E1 set in the image data insertion area for the image data set G1 is shifted in the direction shown by the selected arrow icon by a predetermined length.

Likewise, in the case where the user 1 clicks "+" or "−" of magnifying glass icons 52, the trimmed image generated from the image data set G2 is enlarged or reduced by the predetermined ratio, with the center of the trimmed image being located at the reference point E2. In the case of clicking one of arrow icons 53, the reference point E2 set in the image data insertion area for the image data set G2 is shifted in the direction shown by the clicked arrow icon, by a predetermined length.

Furthermore, in the customization Web page, positions and colors for the sender information, and text printed on the postcards can be changed. The user 1 clicks an OK button 54 after completion of the customization.

The order reception server 21 displays the finish confirmation Web page 33 again when the user 1 clicks the "OK" button 54 in the customization Web page 34. The user 1 clicks the "Add to Favorites" button 47 if a result of the finish of the print image is satisfactory in the finish confirmation Web page 33.

The order reception server 21 stores the postcard data set PD in the database 23 when the user 1 clicks the "Add to Favorites" button 47 in the finish confirmation Web page 33. The order reception server 21 then displays a favorites Web page that is not shown (Step S22). In this page, the user 1 can input the quantity for the postcard data set displayed in the favorites Web page. The order reception server 21 calculates charges therefor and displays an initial charge, a printing charge, and a total charge. The user 1 confirms the content of the print order and the charges, and clicks a "Go to Cashier" button if the user agrees. In the case where the user 1 wishes to generate another postcard data set PD', the user 1 clicks a "Search for Another Postcard" button (Step S23).

The order reception server 21 displays the template selection (step 1) Web page when the user 1 clicks the "Search for Another Postcard" button in the favorites Web page. The procedures from Step S19 to Step S22 are then repeated to enable the user 1 to generate and register the postcard data set PD'.

In this embodiment, the user 1 is assumed to have clicked the "Go to Cashier" button, without adding the postcard data set PD'.

The order reception server 21 displays another one of the pages when the user 1 clicks the "Go to Cashier" button in the favorite Web page. In the case where the user 1 has designated the agency, an order confirmation web page (not shown) is displayed. In the case where agency designation has not been carried out, an agency designation Web page (not shown) is displayed (Step S24). In this embodiment, the user 1 is assumed not to have designated the agency.

The order reception server 21 displays the agency designation Web page (Step S25) when the user 1 clicks the "Go to Cashier" button in the favorites Web page. Candidates for the agency are displayed in this page, and the user 1 can select one of the candidates. The user 1 selects the agency and clicks a "Next" button in this page.

The order reception server 21 displays a final order confirmation Web page that is not shown (Step S26) when the user clicks the "Next" button in the agency designation Web page. The user 1 confirms the content of the print order in the order confirmation Web page, and clicks a "Confirm Order" button. The content of the print order is then sent as order information to the order reception server 21.

The order reception server 21 in the print order reception center 2 receives the order information (Step S2 in FIG. 2), and generates the postcards P by printing the postcard data set PD according to the order information (Step S3). The label KP on which the address information K of the agency designated by the user 1 is printed is also generated (Step S4). The label KP is pasted on the bag containing the postcards P and delivered to the agency address (Step S5). The DPE store 3 receives the postcards P (Step S6). The user 1 visits the DPE store 3 and receives the postcards P after paying the total charge (Step S7) to end the whole procedures.

As has been described above, the image data sets G can be inserted appropriately in the image data insertion areas in each of the templates by matching the image data reference points D specified by the user 1 with the predetermined reference points E on the image data insertion areas. Therefore, the composite images (that is, the print images) generated from the image data sets G and the template data sets T can be displayed at the time the user 1 selects the desired template data set to be used. Therefore, the user 1 can easily select the desired template data set, and does not need to re-specify how to insert the image data sets G if the user 1 changes the template data set T to be used.

A skilled artisan would know that computer readable media are not limited to any specific type of storage device and include any kind of device, including but not limited to CDs, floppy discs, RAMs, ROMs, hard discs, magnetic tapes, and internet downloads, in which computer instructions can be stored and/or transmitted. Transmission of the computer code through a network or through wireless transmission means is also within the scope of this invention. Additionally, computer code/instructions include, but are not limited to, source, object, and executable code and can be in any language including higher level languages, assembly language and machine language.

What is claimed is:

1. A composite image generation method for generating a composite image by inserting image data in an image data insertion area for the image data, the composite image generation method comprising the steps of:

setting insertion information including an image data reference point which is a reference point in the image data and is to be matched with a predetermined reference point in the image data insertion area; and generating the composite image by inserting the image data in the image data insertion area, based on the insertion information.

2. A composite image generation method as defined in claim 1, wherein the insertion information further includes an enlargement ratio and/or a rotation angle of an image represented by the image data with reference to the image data reference point.

3. A composite image generation apparatus for generating a composite image by inserting image data in an image data insertion area for the image data, the composite image generation apparatus comprising:

insertion information setting means for setting insertion information including an image data reference point which is a reference point in the image data and is to be matched with a predetermined reference point in the image data insertion area; and composition means for generating the composite image by inserting the image data in the image data insertion area, based on the insertion information.

4. A composite image generation apparatus as defined in claim 3, wherein the insertion information further includes an enlargement ratio and/or a rotation angle of an image represented by the image data with reference to the image data reference point.

5. A computer-readable recording medium storing a program that causes a computer to execute a composite image generation method for generating a composite image by inserting image data in an image data insertion area for the image data, the program comprising the procedures of:

setting insertion information including an image data reference point which is a reference point in image data and is to be matched with a predetermined reference point in an image data insertion area; and generating a composite image by inserting the image data in the image data insertion area, based on the insertion information.

6. A computer-readable recording medium as defined in claim 5, wherein the insertion information further includes an enlargement ratio and/or a rotation angle of an image represented by the image data with reference to the image data reference point.

* * * * *